(12) United States Patent
Osawa

(10) Patent No.: US 9,282,211 B2
(45) Date of Patent: Mar. 8, 2016

(54) IMAGE FORMING APPARATUS, CONTROL METHOD, AND STORAGE MEDIUM IN WHICH DATA IS SHARED BETWEEN APPLICATIONS

(71) Applicant: CANON KABUSHIKI KAISHA, Tokyo (JP)

(72) Inventor: Takaharu Osawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/609,765

(22) Filed: Jan. 30, 2015

(65) Prior Publication Data

US 2015/0222774 A1     Aug. 6, 2015

(30) Foreign Application Priority Data

Feb. 5, 2014   (JP) ................................ 2014-020724

(51) Int. Cl.
*G06F 3/12* (2006.01)
*H04N 1/00* (2006.01)

(52) U.S. Cl.
CPC ......... *H04N 1/00941* (2013.01); *H04N 1/0083* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| 2003/0200269 | A1* | 10/2003 | Maehara et al. | ............... 709/206 |
| 2010/0110473 | A1* | 5/2010 | Harrington | .................. 358/1.15 |
| 2011/0055323 | A1 | 3/2011 | Kawai et al. | .................. 709/203 |
| 2011/0252347 | A1 | 10/2011 | Osawa | ......................... 715/765 |
| 2012/0069379 | A1* | 3/2012 | Tamura | ........................ 358/1.14 |
| 2013/0074048 | A1 | 3/2013 | Osawa et al. | .................. 717/127 |

FOREIGN PATENT DOCUMENTS

JP        2011-55075 A      3/2011

* cited by examiner

*Primary Examiner* — Gabriel Garcia
(74) *Attorney, Agent, or Firm* — Fitzpatrick, Cella, Harper & Scinto

(57) ABSTRACT

Provided is an image forming apparatus that accepts a processing request if the processing request is performed via a relay function by using function information of a function provided by an application, executes the function provided by the application in response to an instruction according to the processing request, and notifies the relay function about the execution result. The application is realized as a servlet.

9 Claims, 13 Drawing Sheets

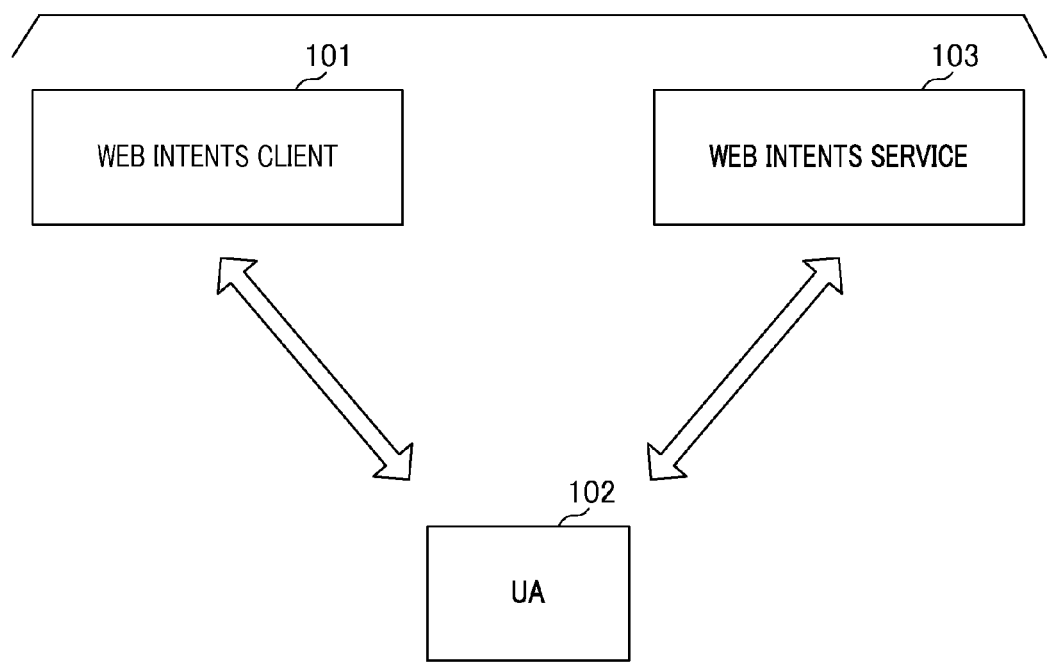

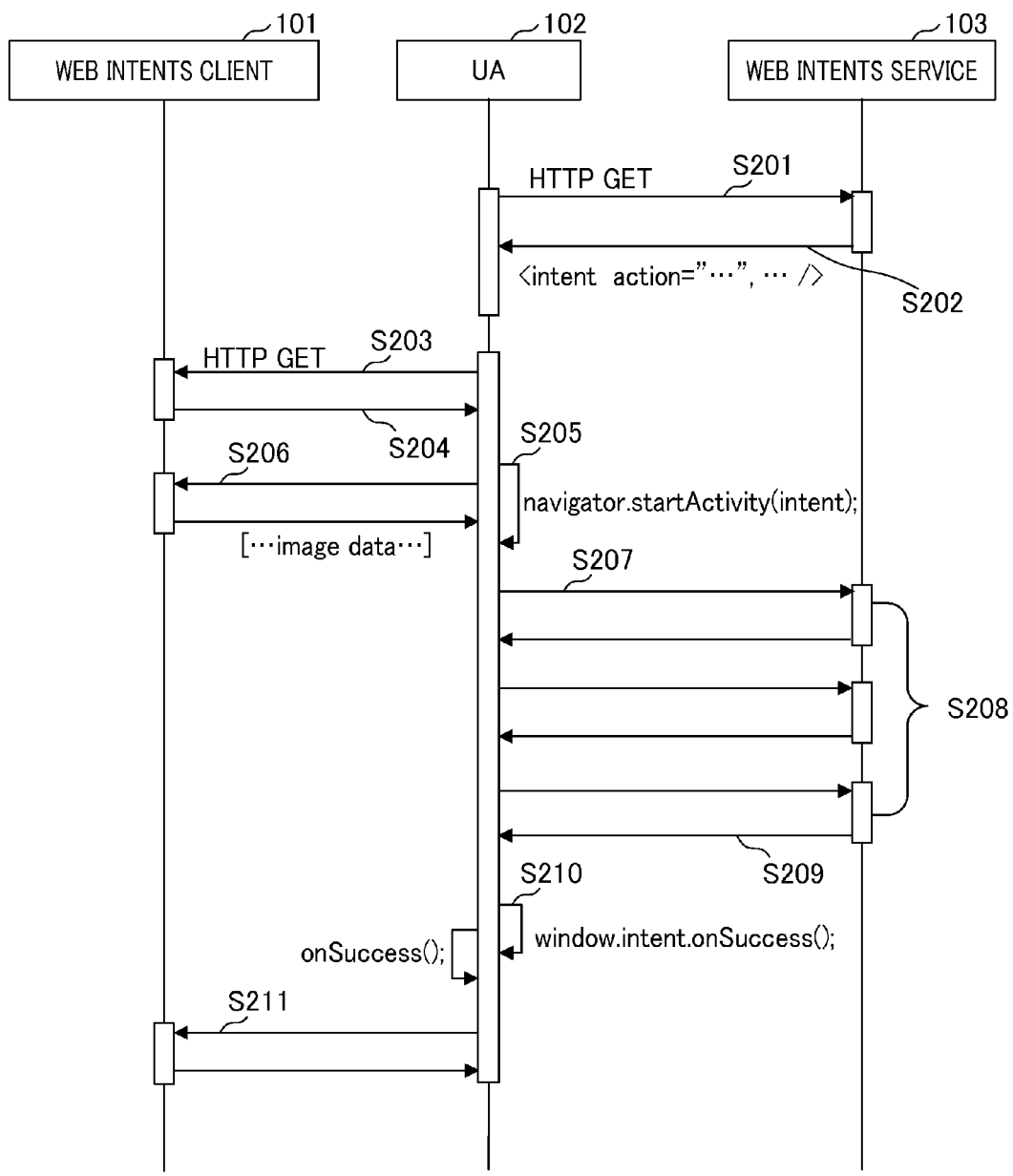

FIG. 3

```
<intent
  action="http://webintents.org/share"
  type="image/*"
  href="share.html"
  title="Share image using e-mail"
  disposition="window"
/>
```

FIG. 4

```
document.getElementById('share-photo').addEventListener(
"click", function() {
  var intent = new Intent(
{"action":"http://webintents.org/share",
    "type":"image/jpeg",
     "data":getImageFrom(...)});
   navigator.startActivity(intent, onSuccess);
}, false);
```

IMAGE FORMING APPARATUS, CONTROL METHOD, AND STORAGE MEDIUM IN WHICH DATA IS SHARED BETWEEN APPLICATIONS

BACKGROUND OF THE INVENTION

1. Field of the Invention

The present invention relates to an image forming apparatus that shares data between applications, a control method, and a storage medium.

2. Description of the Related Art

There has recently been proposed a mechanism for calling any web services (or web applications) from a web application through a web browser and cooperating with them respectively. An example is a mechanism called Web Intents, which puts a service receiving side and a service providing side into a loosely coupled state by delay binding that delays a processing until executing, and thereby realizes the cooperation, is proposed.

Also, in a conventional image forming apparatus, an environment for an extending function by installing applications and services is arranged. However, a system for cooperating with other applications and services is not installed. Thus, when an operation moves from one application to another application, a user may have to carry out an operation to return to a main screen once.

As a prior art, Japanese Patent Laid-Open No. 2011-55075 discloses a system in which an application of a server apparatus prepares HTML, which uses Java Script®, and uses functions or acquires data of an image forming apparatus.

In the system that Japanese Patent Laid-Open No. 2011-55075 discloses, a browser interprets the JavaScript® written in the HTML content and issues a command. The system that Japanese Patent Laid-Open No. 2011-55075 discloses does not especially expect, for example, the mechanism by which the applications such as Web Intents described above cooperate.

SUMMARY OF THE INVENTION

The present invention provides a mechanism to enable using a technology of application cooperation such as Web Intents for sharing data or processing data between a plurality of applications, which are the applications that operate in an execution environment of conventional image forming apparatus and the like.

According to an aspect of the present invention, in an image forming apparatus, a relay function for sharing data between a plurality of applications and an application are operated. The image forming apparatus includes an accepting unit configured to accept a processing request if the processing request is performed via the relay function by using function information of a function provided by the application; an executing unit configured to execute the function provided by the application in response to an instruction according to the accepted processing request; and a notifying unit configured to notify the relay function about a result executed by the executing unit. The accepting unit and the notifying unit are realized as servlets of the application.

Further features of the present invention will become apparent from the following description of exemplary embodiments with reference to the attached drawings.

BRIEF DESCRIPTION OF THE DRAWINGS

FIG. 1 is a diagram illustrating an exemplary overall configuration of Web Intents.

FIG. 2 is a sequence diagram illustrating a basic operation of Web Intents.

FIG. 3 is a diagram illustrating an example of a markup which Web Intents service has for registering.

FIG. 4 is a diagram illustrating an example of an Intent processing request generated by a client.

DESCRIPTION OF THE EMBODIMENTS

First Embodiment

Figure 5:
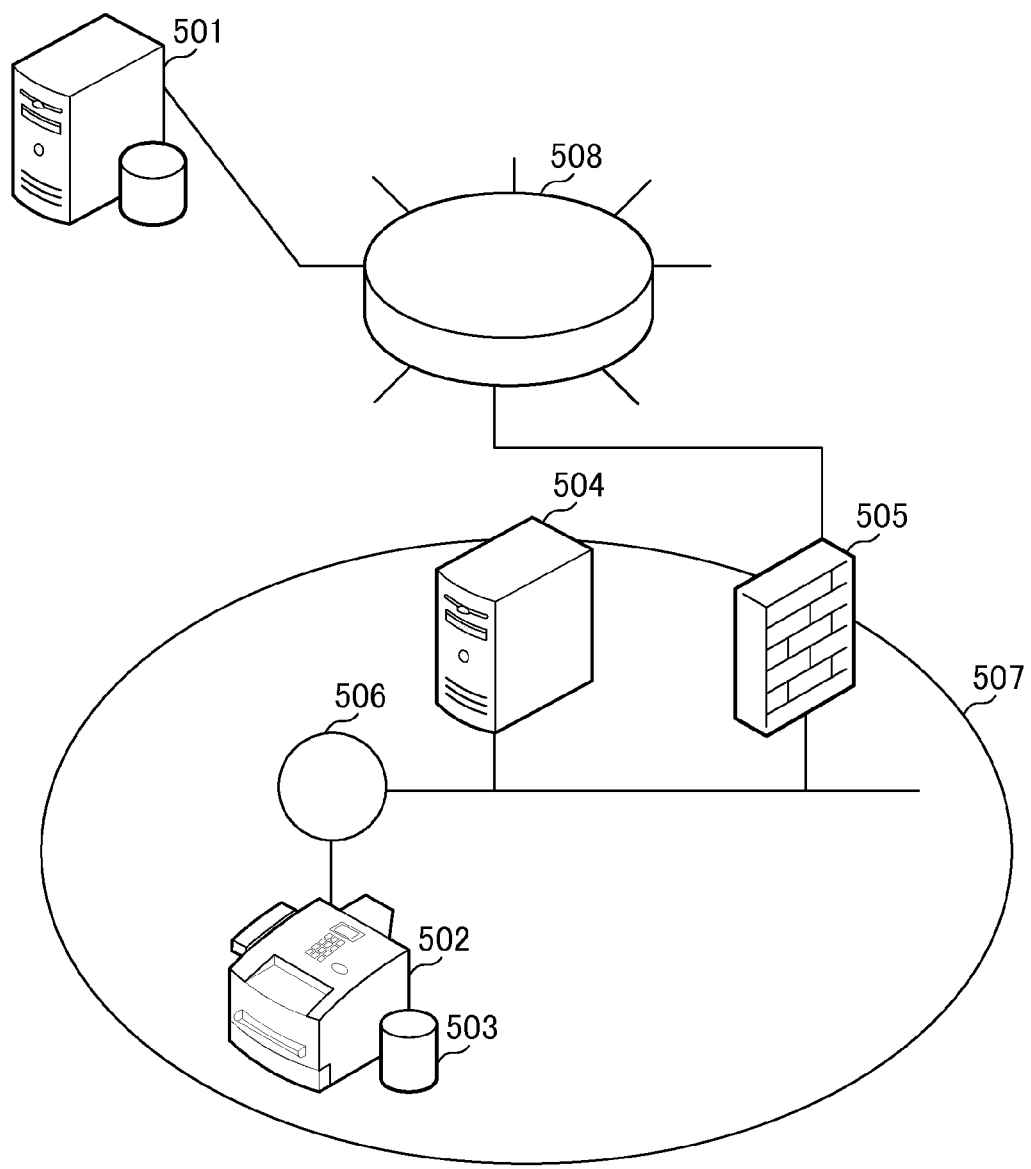
FIG. 5 is a diagram illustrating an exemplary system configuration of a first embodiment.

Hereinafter, embodiments of the present invention will be described with reference to the drawings. In the present embodiment, a description will be given of Web Intents, which is a mechanism for mediating data, as an example of a cooperation function for calling a server application from a client application. However, it is not limited thereto. FIG. 1 is a diagram illustrating an overall configuration of Web Intents. The Web Intents service 103 provides services or functions using Intents technology. A Web Intents client 101 is a client that uses the services. An UA (user agent) 102 transfers a request from the Web Intents client 101 to the Web Intents service 103, and transfers result from the service to the client. In other words, the UA 102 serves as a relay function.

If a social button of SNS sites such as "like", "check", or "share" is compared to the mechanism of the Web Intents, the Web Intents client 101 is a site in which the button is arranged. Note that SNS is an abbreviation for "social networking service". And the UA 102 is a browser, and the Web Intents service 103 is a contribution destination service such as "like" and the like. If a user authentication or an operation by an user is required upon providing functions by the Web Intents service 103, the user operates on the UA 102.

Note that if the UA 102 has a function for cooperating with a service described below, the UA can be realized by an apparatus other than a browser such, as operating system (OS) or an application and the like that operates on an information processing terminal. Here, as examples for the information processing terminal, there are a personal computer (PC), a smart phone, tablet, car navigation, and the like.

Furthermore, with respect to the Web Intents service 103, devices, for example, a camera, incorporating the information processing terminal, a printer, a scanner and the like, other than service provider on the internet such as the contribution destination service described above may be the service provider. Also, with respect to the Web Intents service 103, peripheral equipment such as a printer, a scanner, a network camera and the like connected by the network, or a home electric appliance such as a refrigerator or a television, may be the service provider.

FIG. 2 is a sequence diagram illustrating a basic operation for a providing service using Web Intents. In S201, the UA 102 accesses the Web Intents service 103 by the operation of the user. In S202, the Web Intents service 103 replies to the UA 102 with a HTML response including the markup for registering, which is for the UA 102 registering the provided service.

A description will be given of a content of the HTML response returned by the Web Intents service 103 to the UA 102 by using the example shown in FIG. 3. In the present embodiment, a description will be given by taking an example of using a service that can "share" image data of any format, but it is not limited thereto. In the <Intent> tag, information for specifying the service is described. "action" indicates a function or a service provided by the service specified by the <Intent> tag, and "type" indicates a data format that can be handled in the "action". "href" indicates URL of the service, and "title" indicates a title of the service. Furthermore, "disposition" indicates how the service is displayed.

In this example, the Web Intents service 103 is specified by the <Intent> tag, which indicates that image data of any format can be "share (shared)" by the "action" and the "type". Also, it is indicated that a connection destination of the image data is "share.html", the title is "Share image using e-mail", and that this is displayed by another window.

When the HTML response shown in FIG. 3 is received, the UA 102 prompts the user to confirm whether or not to register the Web Intents service to the UA 102. For example, if the UA 102 is a browser, it displays a popup window and prompts the user to select whether or not to register the Web Intents service. If the user selects to register this Web Intents, the UA 102 stores the Web Intents service inside.

In S203, the UA 102 accesses the Web Intents client 101 by the operation of the user. In S204, the Web Intents client 101 replies to the UA 102 with the HTML response in which using the Web Intents service 103 is described. For example, in a certain website with an image and a "share" button, the website replies with the HTML response including ECMAScript shown in FIG. 4 to the UA 102.

A description will be given of a content of the HTML response replied by the Web Intents client 101 to the UA 102 by using an example shown in FIG. 4. ECMAScript indicates that when a button having an ID "share-photo" in the HTML is clicked, a specified anonymous function is executed. The anonymous function firstly generates a new Intent object and calls a startActivety( ) function with this argument. When the function is executed, the UA 102 extracts the Web Intents service 103 that matches the "action" and the "type" of the specified Intents from the internally registered Web Intents services 103 and displays a list to thereby request the user to select. Also by executing getImageFrom( ) function called from the anonymous function, the UA 102 acquires the image data that the Web Intents client 101 has.

In S205, the UA 102 receives the HTML response and displays it on the screen. In S206, when the "share" button is pressed by the user, the UA 102 executes the ECMAScript for starting the Web Intents as described above, and acquires the image data that the Web Intents client 101 has. Also, by pressing the "share" button, the UA 102 displays the list of the Web Intents service 103 registered internally. When the Web Intents service 103 is selected by the user from the list, the UA 102 transmits a request to the selected Web Intents service 103 in S207. At this time, the UA 102 includes the content of the Intent object, which the ECMAScript shown in FIG. 4 has generated, in transmission data.

In S208, the Web Intents service 103 extracts the Intent object from the request, and by interacting with the user via the UA 102, realizes utilization of the selected service (here, "share" the image). For example, when the user visits the website that has an image and a share button and presses the share button, a list of the services is displayed in the popup window. Thereupon, if the web mail service is selected, a new mail with the image data attached to is generated, and the user can transmit the email.

In S209, when the Web Intents service 103 ends a processing, the Web Intents service 103 returns the response including ECMAScript for transferring the processing result to the Web Intents client 101. In S210, the UA 102 executes the ECMAScript included in the response, and calls onSuccess( ), which is a callback function specified by the argument of the startActivety( ) function in S205. In S211, the UA 102 replies with the processing result to the Web Intents client 101 by the callback function onSuccess( ).

As the above-described processing, the Web Intents client 101 can call the Web Intents function and the service (in this example, "share" the image) that is provided by the Web Intents service 103 via the UA 102.

FIG. 5 is a diagram illustrating the relation between the Web Intents client and the image forming apparatus, including the UA and the Web Intents service connected via the internet, according to one embodiment of the present invention. In FIG. 5, a client 501 corresponds to the above-described Web Intents client 101 and here, it is a Web Intents client that describes a general website that provides a storage function such as storing image data and the like. In the present embodiment, the Web Intents client 501 is configured by a general purpose computer and is connected via an Internet 508.

The image forming apparatus 502 is an image forming apparatus which includes the above-described UA 102 and the Web Intents service 103 including an application that supports the Web Intents service. The image forming apparatus 502 includes the UA, which is a browser, and the Web Intents service, which is a website (web application) that provides functions and services. Furthermore, Intranet environment 507 indicates that the image forming apparatus 502, a Proxy Server 504, and a firewall 505, which is installed for enhancing security of an Intranet, are mutually connected via a LAN 506. In practice, a plurality of the Intranet environment 507 and the image forming apparatus 502, including the UA 102 and the Web Intents service 103, are mutually connected via the Internet 508.

Figure 6A:
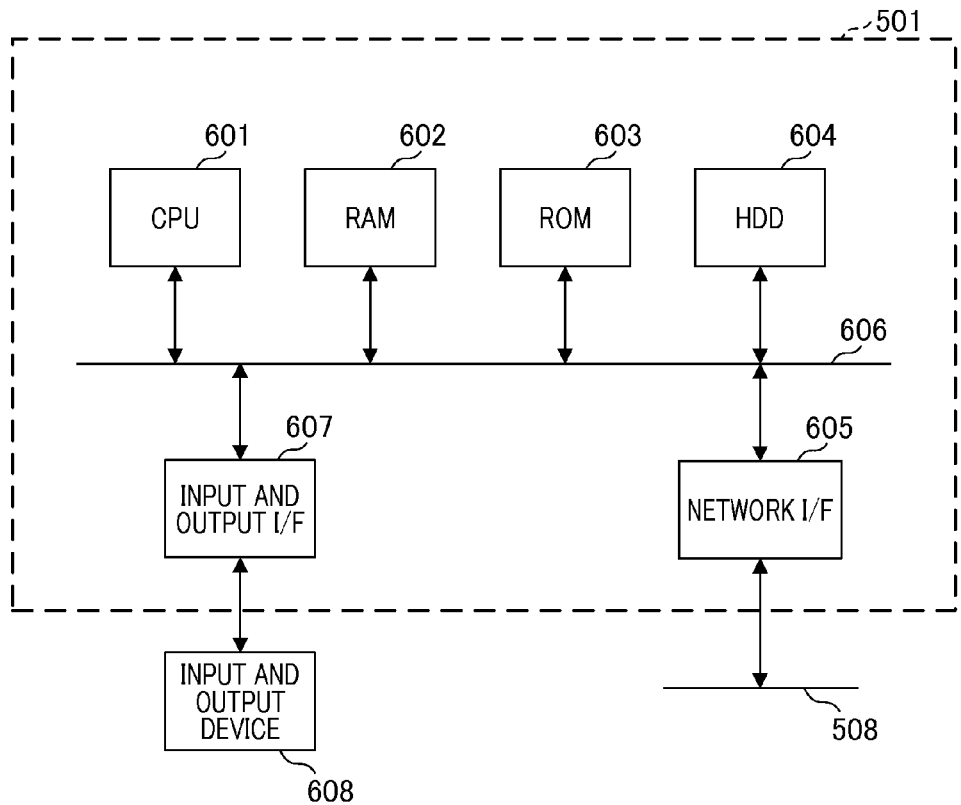
FIGS. 6A and 6B are diagrams illustrating exemplary hardware configurations of a client and an image forming apparatus.
Figure 6B:
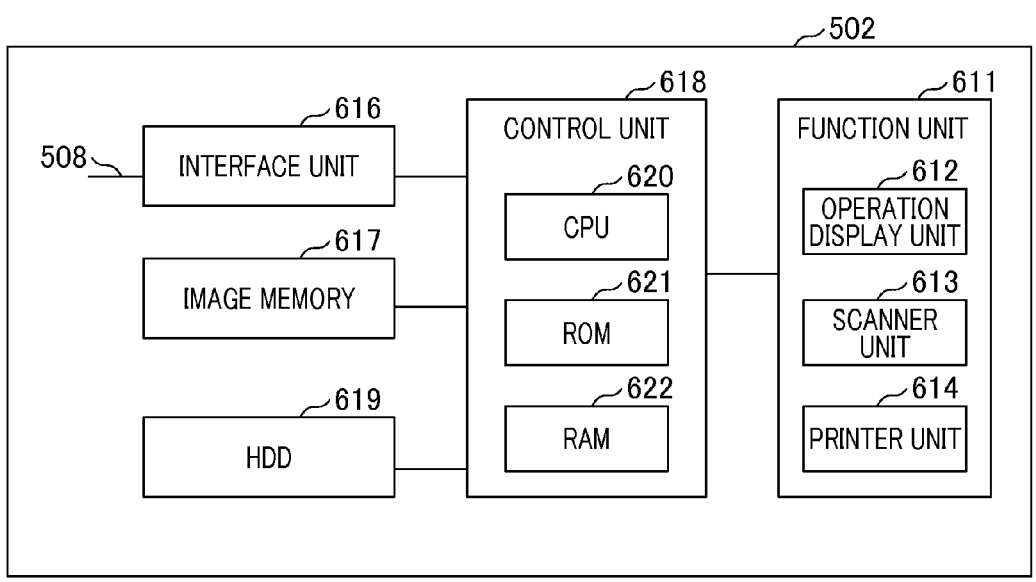

FIG. 6A is a diagram illustrating a hardware configuration of the Web Intents client 501 configured by the general purpose computer. FIG. 6B is a diagram illustrating a hardware configuration of the image forming apparatus 502 including the UA 102 and the Web Intents service 103.

In FIG. 6A, the Web Intents client 501 includes a CPU 601 to an input and output I/F 607. Each of the units can transmit and receive data via an internal bus 606. The CPU (Central Processing Unit) 601 integrally controls each of the units via the internal bus 606. Also, CPU 601 loads and executes a program stored in a RAM 602, which is a temporary work area, from a ROM 603 or a HDD 604, to thereby realize various processing. The RAM, the ROM, the HDD are respectively abbreviations for "Random Access Memory", "Read Only Memory", "Hard Disk Drive". The input and output I/F 607 includes, for example, PS2 or Universal Serial Bus (USB I/F), and an analog or digital display I/F. An input and output device 608 is a keyboard, a mouse, and a CRT or a liquid crystal display, and can connect to the management server via the input and output I/F 607.

In FIG. 6B, the image forming apparatus 502 includes a function unit 611, an interface unit 616, an image memory 617, a control unit 618, and an HDD 619. The control unit 618 includes a CPU 620, a ROM 621, and a RAM 622, and controls the overall operation of the image forming apparatus 502. The CPU 620 reads a control program stored in the ROM 621 and thereby executes various control processing such as reading control, transmission control and the like. The RAM 622 is used as a main memory of the CPU 620 and a temporary storage area such as a work area and the like. Furthermore, the control unit 618 is connected to the function unit 611 and controls operation of an operation display unit 612, a scanner unit 613, and a printer unit 614.

In the operation display unit 612, a display unit such as liquid crystal display having a touch panel function, a keyboard and the like are arranged. The operation display unit 612 includes a browser function corresponding to the UA 102, and the browser analyzes the received HTML file and displays an operation screen based on a description of the analyzed HTML file to the operation display unit 612.

The printer unit 614 prints image data, which is outputted from the control unit 618, on a sheet. The scanner unit 613 reads an image of a document, generates the image data and outputs the image data to the control unit 618. The interface unit 616 receives the image data for printing from an external image processing apparatus (not shown) by connecting the control unit 618 to the Internet 508, or receives screen data for displaying on the operation display unit 612. The HDD 619 stores the image data and various programs. A UA 102 and the various programs including the Web Intents service 103 of the present embodiment are also stored in the HDD 619. Note that the image data for printing received from the external information processing apparatus is temporarily stored in the image memory 617, and is printed by the printer unit 614 via the control unit 618.

Figure 7A:
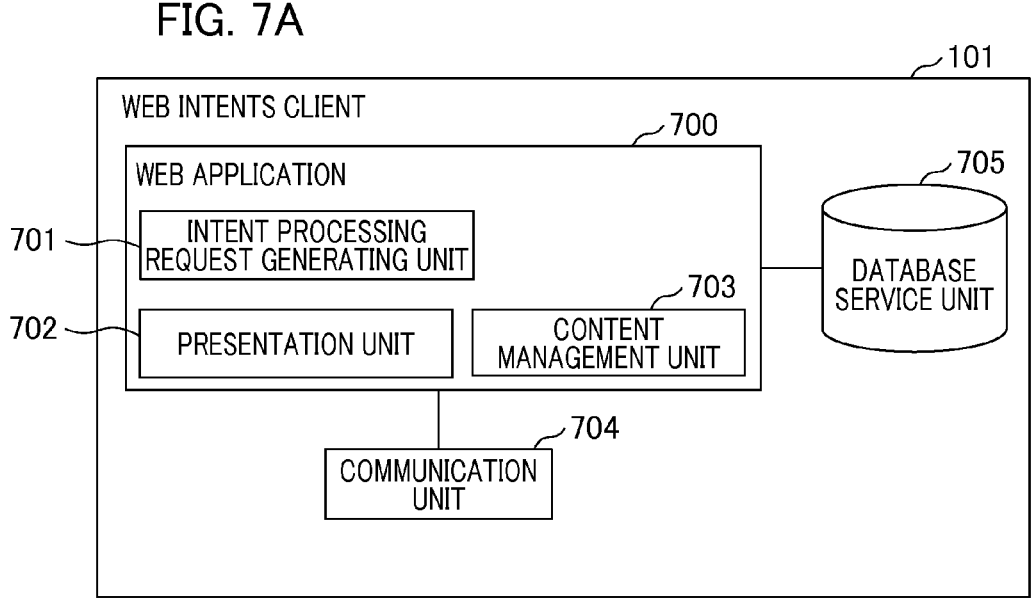
FIGS. 7A and 7B are diagrams illustrating exemplary software configurations of a client and a US.

FIG. 7A is a diagram illustrating an exemplary software (processing unit) configuration of the Web Intents client 101 which operates on the Web Intents client 501. The Web Intents client 101 includes a web application 700, a communication unit 704, and a database service unit 705. The web application 700 and each of the processing units exist as files stored in the HDD 604 of the Web Intents client 501. These are program modules that are loaded into the RAM 602 and executed by the OS or other processing units that use each of the processing units at run time.

The web application 700 is an application which provides a storage function, for example, for storing contents such as image data and the like. The web application 700 is installed as a program for replying to HTTP (Hypertext Transfer Protocol) requests and for executing the processing. The web application 700 includes an Intent processing request generating unit 701, a presentation unit 702, and a content management unit 703.

The Intent processing request generating unit 701 is a software module that generates ECMAScript, which is a processing request of the Intent. The presentation unit 702 is a software module that generates a HTML document according to a received page acquisition request and the like via the communication unit 704. The content management unit 703 is a software module that acquires and stores contents, according to the request from the presentation unit 702, from the HDD 604 by a database service unit 705. The database service unit 705 is a software module that stores and extracts the contents from the HDD, according to the requests from other processing units. The database service unit 705 may be on other devices different from the Web Intents client 501.

Figure 7B:
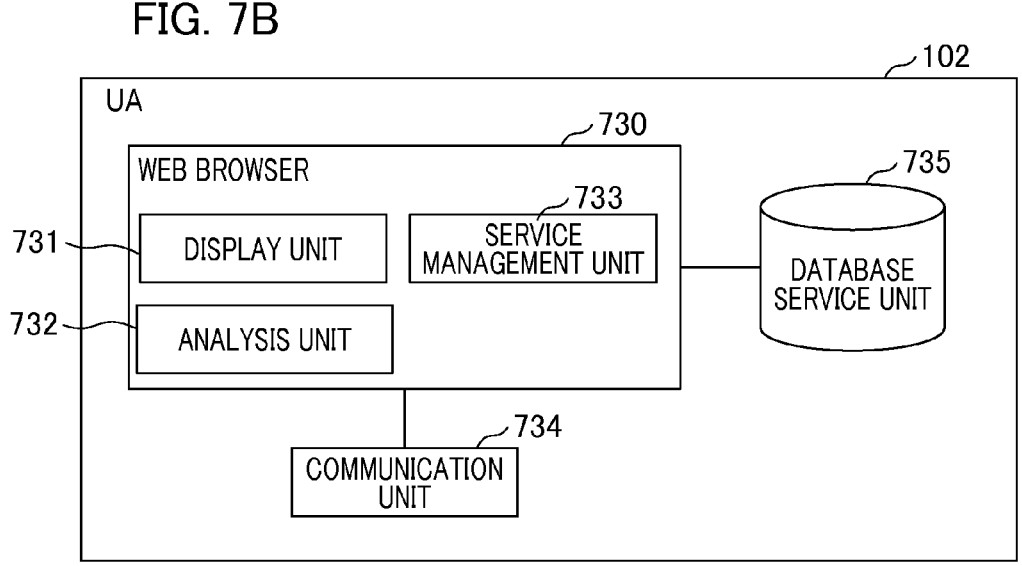

FIG. 7B is a diagram illustrating an exemplary software (processing unit) configuration of the UA 102 that operates on the image forming apparatus 502. The UA 102 includes a web browser 730, a communication unit 734, and a database service unit 735. The browser 730 and each of the processing units exist as files stored in the HDD 619 of the image forming apparatus 502. These are program modules that are loaded into the RAM 622 and executed by the OS or other processing units that use each of the processing units at run time.

The browser 730 includes a display unit 731, an analysis unit 732, and a service management unit 733. The display unit 731 is a software module that renders the HTML document. Also the display unit 731 displays a screen to make the user select the Web Intents service according to the request of the service management unit 733. The analysis unit 732 is a software module that analyzes the HTML document. Also the analysis unit 732 analyzes ECMAScript, which is the Intent processing request. The service management unit 733 is a software module that acquires and stores the registered Web Intents services from the HDD 619 by the database service unit 735.

Figure 8A:
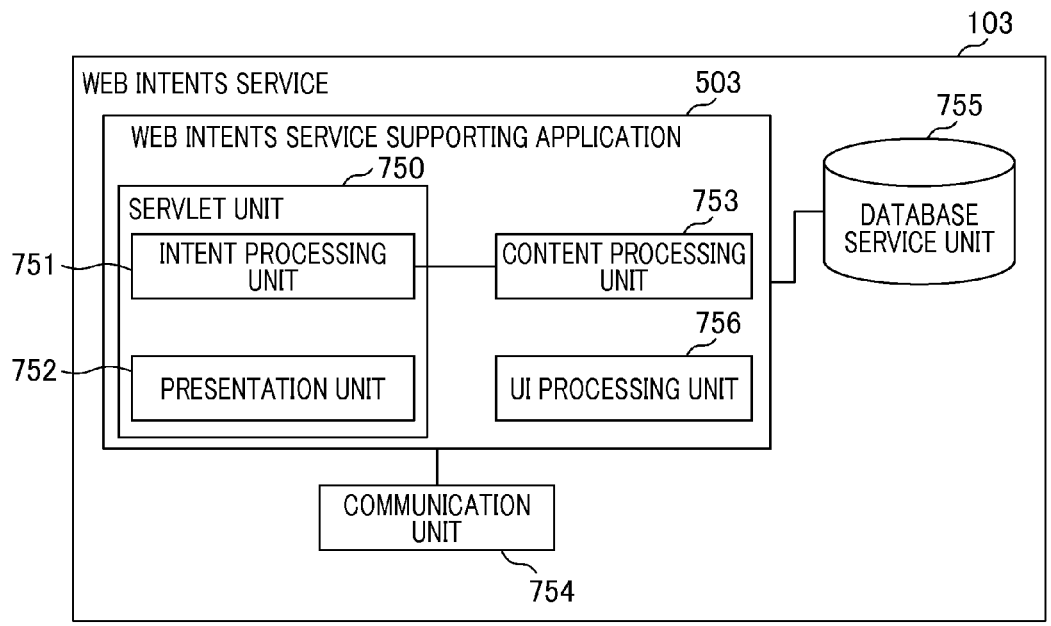
FIGS. 8A and 8B are diagrams illustrating exemplary software configurations of a Web Intents service and an application corresponding to the Web Intents service.
Figure 8B:
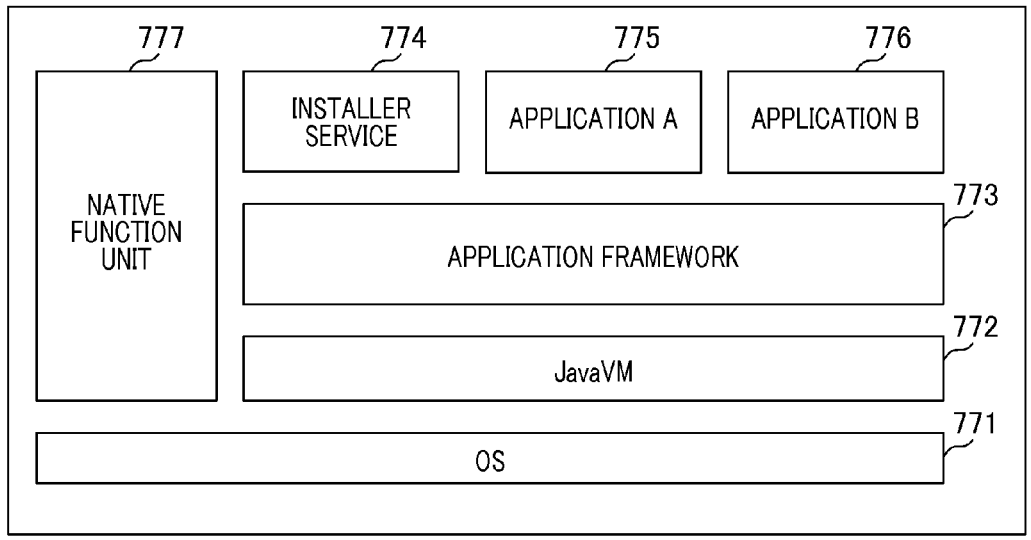

FIG. 8A is a diagram illustrating an exemplary software (processing unit) configuration of the Web Intents service 103 that operates on the image forming apparatus 502. FIG. 8B is an exemplary software structure of the image forming apparatus 502 where a Web Intents service supporting application 503 operates.

Note that in the present embodiment, an example is described in which the image forming apparatus 502 having at least the printer unit or the scanner unit further includes the execution environment where the Web Intents service supporting application 503 operates. However, the present invention can be applied to an information processing apparatus such as mobile terminal or car navigation that can have a similar execution environment.

Firstly, a description will be given of FIG. 8B. The image forming apparatus 502 includes an OS 771 to a Native function unit 777. Each of software shown in FIG. 8B is stored in the ROM 621 or the HDD 619, and is executed by the CPU 620. The OS (Operation System) layer 771 is generally a real time OS but can be a general purpose OS such as Linux® and the like. A Java® VM 772 is a virtual machine such as Java® and provides the execution environment of the application. An application framework 773 provides a function for managing the life cycle of the application. An installer service 774 performs install processing by registering a plurality of applications such as applications A and B, which are described below, to the application framework 773.

The application A 775 and the application B 776, which provide the Web Intents service, are the applications installed by the installer service 774 and provide various functions on the image forming apparatus 502. The application A 775 and the application B 776 can be downloaded from outside of the image forming apparatus 502 and installed. At least either of the application A 775 or the application B 776 can perform interactions with the user via the operation display unit 612.

The Native function 777 provides a function incorporated in the image forming apparatus 502. An example of the Native function 777 is a function for performing printing in the printer unit 614 based on the printing data received via the interface unit 616. Note that in the present embodiment, the Java® VM 772, the application framework 773, the application A 775, and the application B 776 are stored in the HDD 619. Also, the Native function 777 is stored in the ROM 621.

FIG. 8A is a diagram illustrating an exemplary software (processing unit) configuration of the Web Intents service 103 that operates on the image forming apparatus 502. The Web Intents service 103 includes the Web Intents service supporting application 503, a communication unit 754, and the database service unit 755. A servlet unit 750 and each of the processing units of the Web Intents service supporting application 503 are stored in the ROM 621 or the HDD 619 and are executed by the CPU 620.

The servlet unit 750 is installed as a program for replying to the HTTP request and executing processing. The servlet unit 750 includes an Intent processing unit 751 and a presentation unit 752. The Intent processing unit 751 is a software module that analyzes the Intent object and instructs a content processing unit 753 to perform processing according to the request from the UA 102. The presentation unit 752 is a software module that generates the HTML document according to the received page acquisition request and the like via the communication unit 754.

The content processing unit 753 is a software module that processes the contents by receiving an instruction from the Intent processing unit 751. For example, the content processing unit 753 is a software module that edits image data and stores the contents to the HDD 619 via the database service unit 755 according to the request. The database service unit 755 stores and extracts data according to the request from the other processing units. Furthermore, the database service unit 755 may be on other devices different from the Web Intents service 103.

Figure 9:
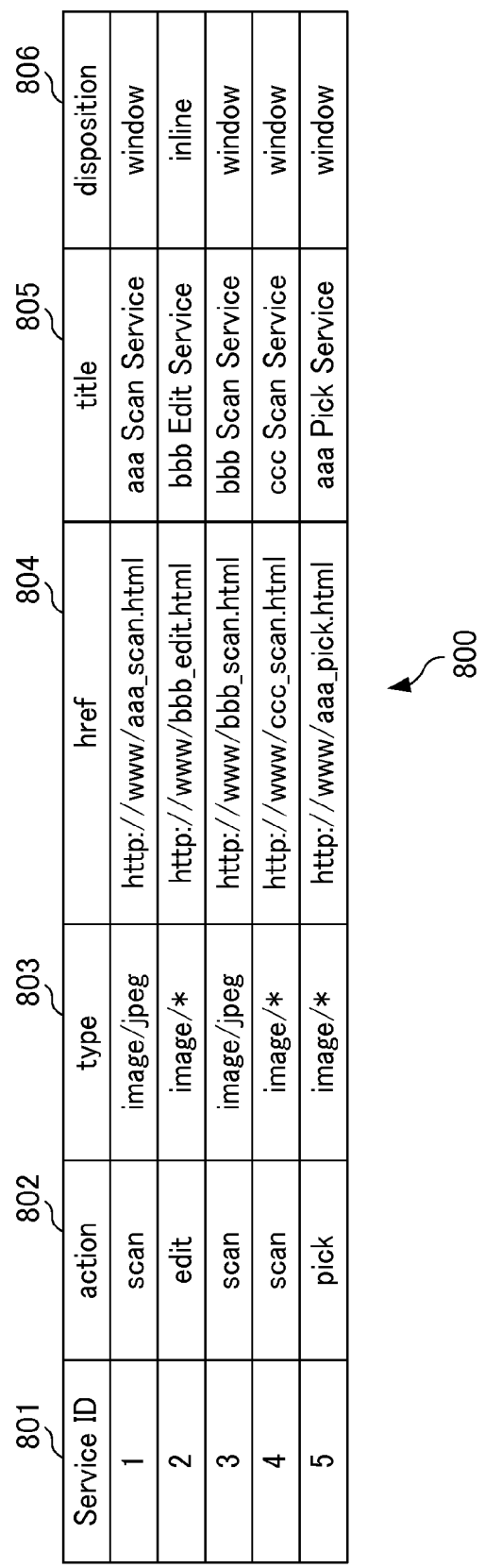
FIG. 9 is a diagram illustrating an example of a registered Web Intents service table of the UA.

FIG. 9 is an example of a registered Web Intents service table that the UA 102 holds for managing the Web Intents services registered to the UA 102 itself. Information shown in FIG. 9 is used as Intent (function information) of the function provided by the Web Intents service 103. The table is held by the HDD 619 in the image forming apparatus 502 and is controlled by the database service unit 735.

A Service ID 801 is an ID for uniquely identifying the Web Intents services in the browser 730. An action 802 is a function provided by the Web Intents service 103 and information indicating the service. A type 803 indicates a data format that can be handled in the action 802.

A href 804 indicates a relative URL of the Web Intents service 103 and the title 805 indicates a title of the Web Intents service 103. A disposition 806 indicates how the Web Intents service 103 is displayed. In other words, the UA 102 can transfer the processing request of the Intents to each of the Web Intents service 103 via the browser 730 by referring the table. Note that in the present embodiment, as shown in FIG. 9, the description is given by assuming the service table as the Service ID 801, action 802, and the type 803, but it is not limited thereto. For example, it is possible to define, in the service table, a function that is provided by a specific service, or to define a restriction condition that restricts the service. For example, a service that becomes a calling object only under a specific condition, such as a scan service requiring authentication and the like, can be registered to the UA 102. Thus, even when many services that can correspond to one request are registered, the service can be narrowed.

Figure 10:
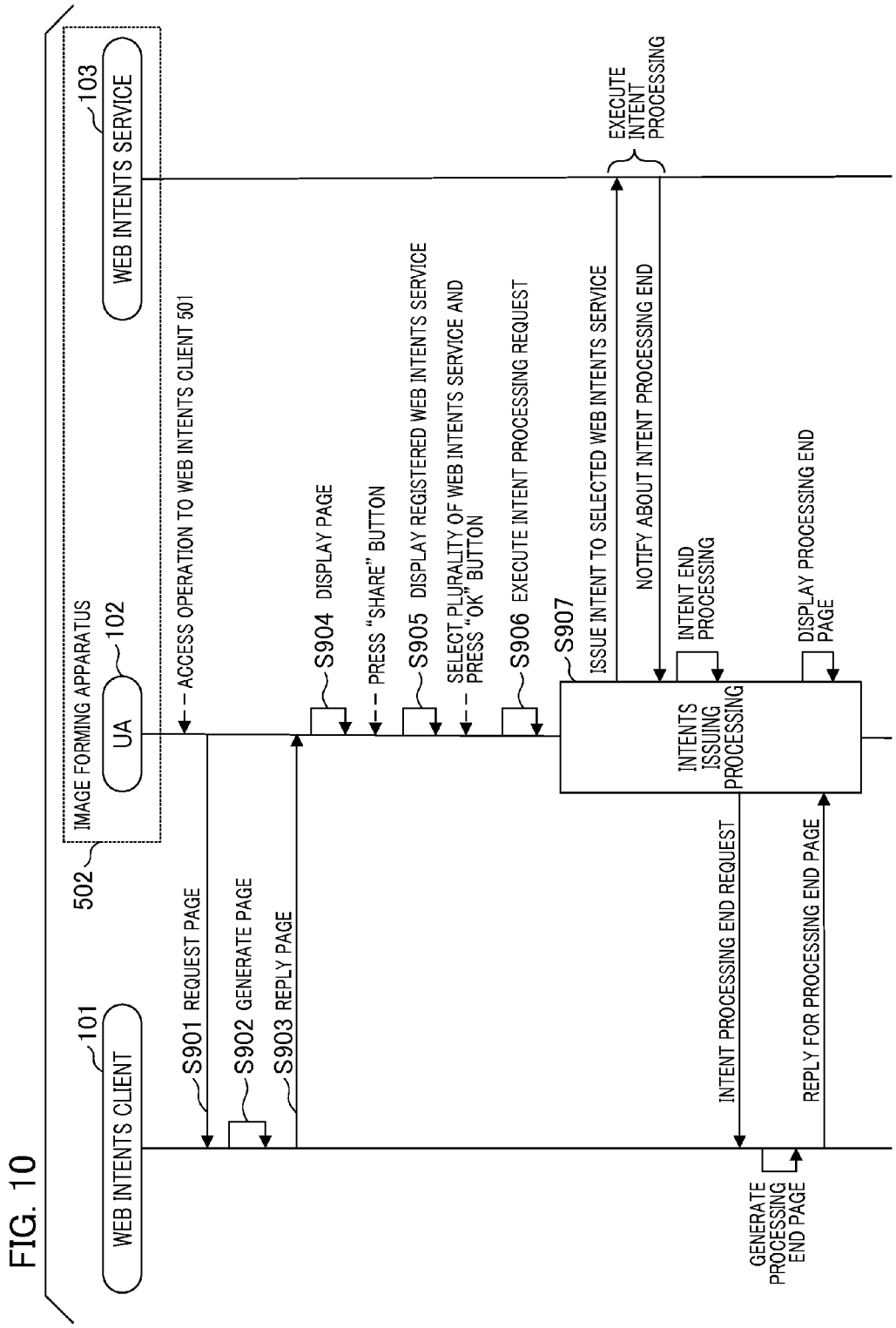
FIG. 10 is a sequence diagram illustrating when the UA issues the Intents processing request.

FIG. 10 is a sequence diagram illustrating when the US 102 accesses the Web Intents client 101 and issues the processing request to the Web Intents service 103. Here, the Web Intents client 101 is handled as a website providing a scan function. Furthermore, a description will be given from the time that the Web Intents service 103 has been already registered to the time that the UA 102 and the UA 102 have accessed the Web Intents client 101.

In S901, the browser 730 of the UA 102 requests a page as a HTTP request message to the Web Intents client 101 via the communication unit 734 by a user operation. In S902, the web application 700 of the Web Intents client 101 generates the page. In S903, the web application 700 of the Web Intents client 101 replies with the page generated in S902 as a HTTP response message to the UA 102. In S904, the display unit 731 of the browser 730 of the UA 102 displays the received page. More specifically, the analysis unit 732 receives and analyzes the HTML document via the communication unit 734 and the display unit 731 renders it.

Figure 11:
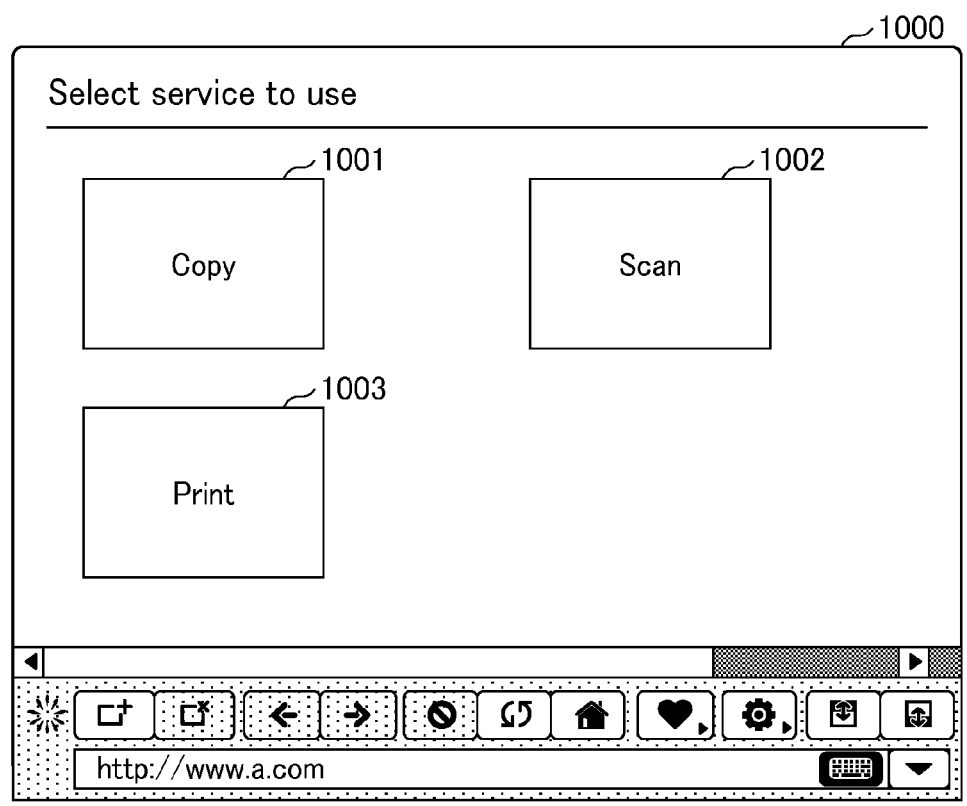
FIG. 11 is a diagram illustrating an exemplary screen of the client displayed by the UA.

Here, a description will be given of an example of a screen displayed in S904 with reference to FIG. 11. FIG. 11 is an example of a screen displayed by the UA 102 in S904. A screen 1000 is displayed by the display unit 731 of the browser 730. Buttons 1001, 1002, and 1003 represent the providing service, and the buttons are for executing the functions of coping, scanning, and printing respectively. The browser 730 executes the Intent processing when the browser 730 has detected that the button 1001, 1002, and 1003 has been pressed.

Figure 12:
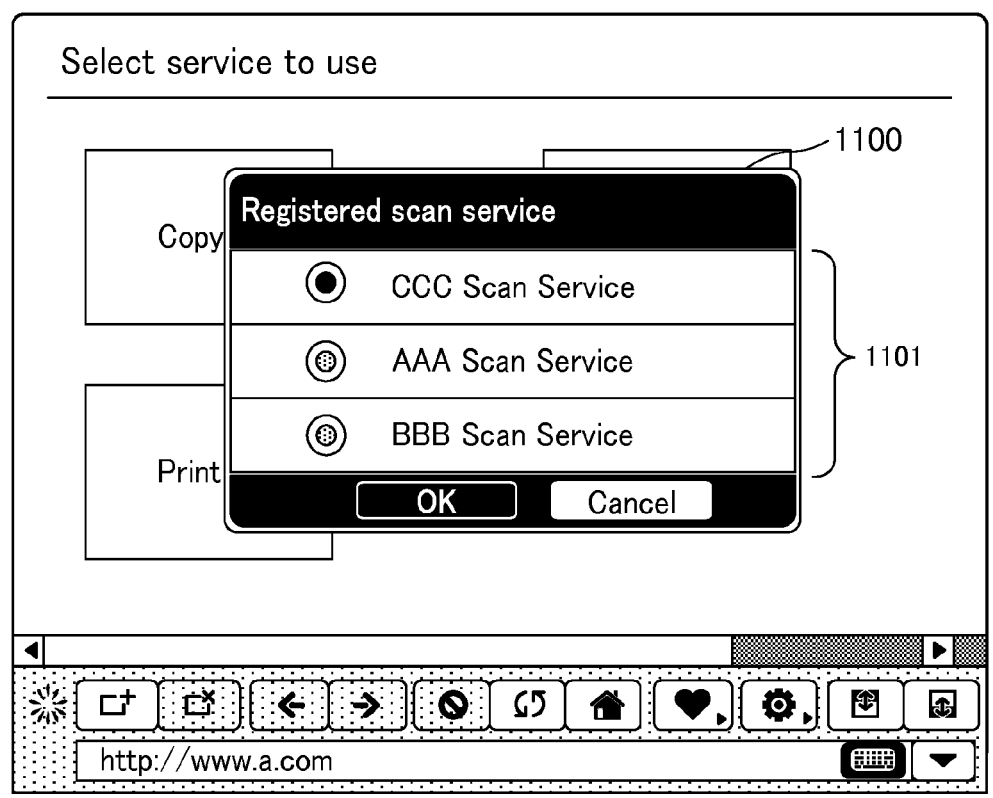
FIG. 12 is a diagram illustrating an exemplary screen displayed by the UA when the share button is pressed.

If the "scan" button 1002 has been pressed by the user in the screen displayed in S904, the browser 730 refers to the registered Web Intents service table 800 (FIG. 9), in S905. And then the browser 730 makes the display unit 731 display the Web Intents service 103, which can execute a scan processing request. Here, since the case in which the button 1002 is pressed is assumed, 1, 3, and 4 of the Service ID 801, in which the action 802 is "scan", becomes the object of the Web Intents service 103. FIG. 12 is an exemplary screen that the browser 730 of the UA 102 displays at this time. A screen 1100 pops up and displayed by pressing the button 1002. A list 1101 is a list of the Web Intents service 103 that became the object of displaying in S905.

If the Web Intents service 103 is selected and the "OK" button 1002 is pressed by the user in the screen displayed in S905, the analysis unit 732 of the browser 730 executes the Intent processing request in S906. In S907, the UA 102 starts an Intents issuing processing.

Figure 13:
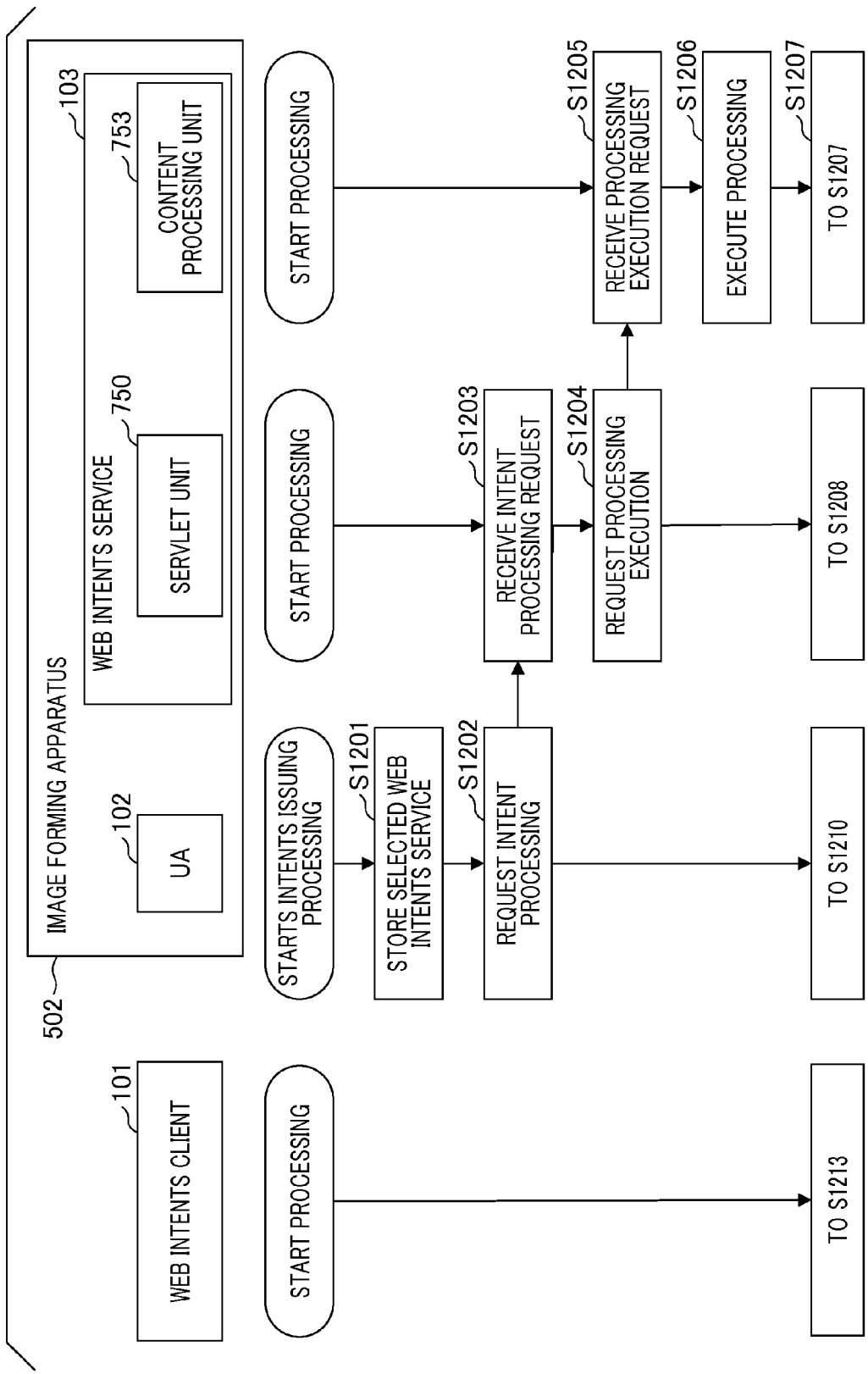
FIG. 13 is a flowchart illustrating a processing which the UA issues the Intents.
Figure 14:
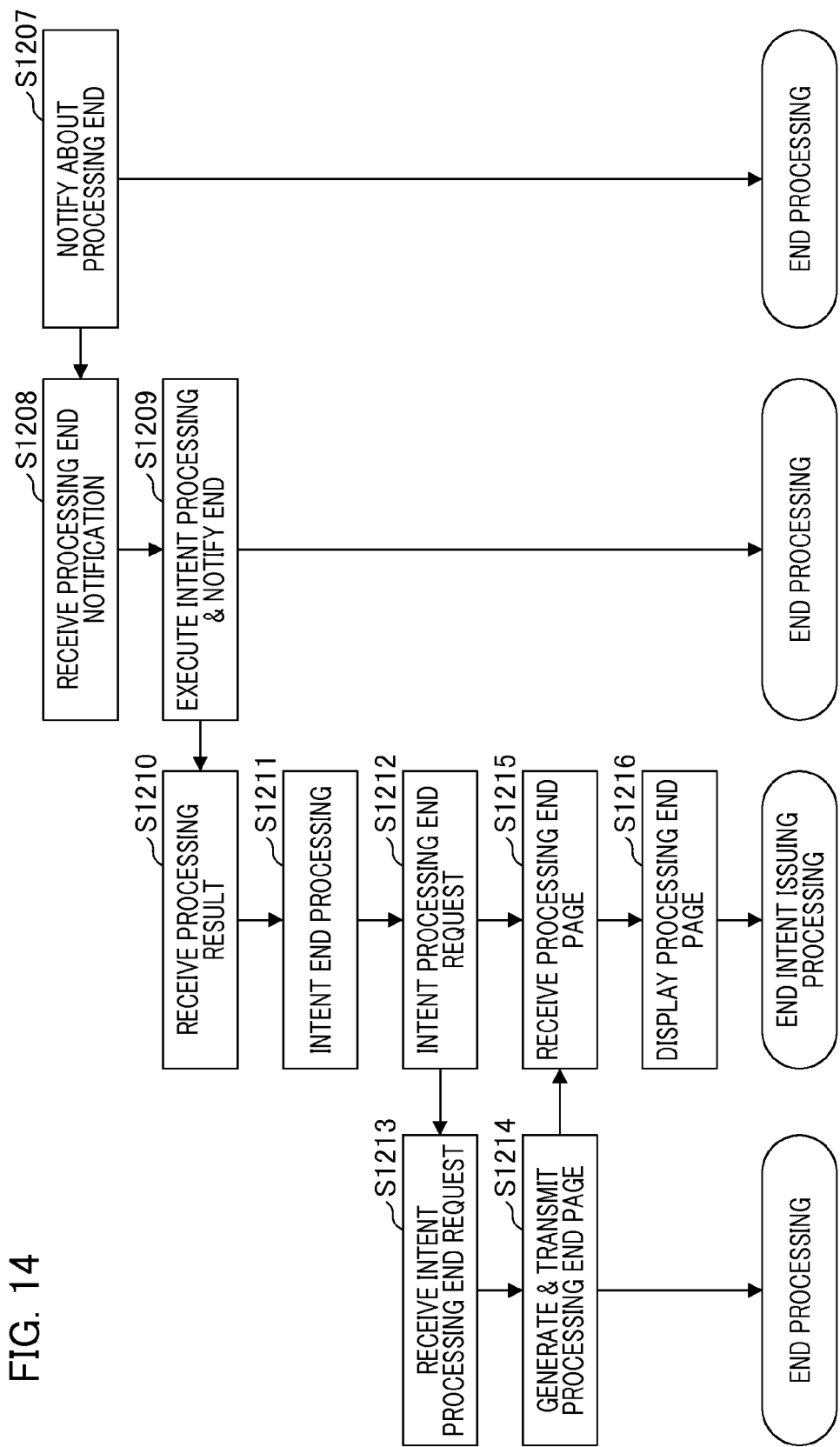
FIG. 14 is a flowchart illustrating which the UA issues the Intents.

A description will be given of the Intents issuing processing of S907 with reference to flowcharts of FIG. 13 and FIG. 14. FIG. 13 and FIG. 14 are flowcharts indicating the Intents issuing processing of the UA 102 including the processing related to the Web Intents client 101 and the Web Intents service 103. In S1201, the UA 102 stores the Web Intents service 103 selected by the user to the RAM 622. In S1202, the UA 102 performs Intent processing request to the Web Intents service 103.

In S1203, the servlet unit 750 receives the Intent processing request from the UA 102. In S1204, the servlet 750 of the Web Intents service 103 extracts and analyzes the Intent object from the request received in S1203, and transmits the processing execution request to the content processing unit 753. In S1205, the content processing unit 753 receives the processing execution request. In S1206, the processing based on the request received in S1205 is started.

In the present embodiment, the content processing unit 753 of the Web Intents service 103 performs "scan" and transfers the image to the Web Intents client, while interacting with the user via the browser 730 of the UA 102. After executing a scan, the content processing unit 753 stores the scan image in the HDD 619. When the scan processing ends, the Web Intents service 103 performs processing end notification to the servlet unit 750 in S1207 shown in FIG. 14. When the servlet 750 receives the processing end notification in S1208, the servlet 750 notifies the UA 102 about the execution result, and more specifically transmits the scan image together with the Intent processing end notification in S1209.

In S1201, the UA 102 receives the processing end notification and the scan image from the Web Intents service 103 and stores the result to the database service unit 735. In S1211, the browser 730 of the UA 102 performs Intent end processing. For example, in S1212, the browser 730 of the UA 102 transmits Intent a processing end request to the Web Intents service 103. In S1213, the Web Intents client 101 receives the Intent processing end request from the UA 102. In S1214, the presentation unit 702 of the Web Intents client 101 generates a processing end page for providing notification about the end of the Intent processing in a HTML document, and transmits the processing end page to the UA 102 via the communication unit 704. In S1215, the UA 102 receives the HTML document of the processing end page transmitted from the Web Intents client 101. In S1216, the browser 730 of the UA 102 displays the processing end page received in S1215.

The above-described processing allows providing a mechanism to enable using a technology of application cooperation even to applications that operate on an execution environment such as conventional image forming apparatuses. More specifically, the UA 102 provides the Web Intents service 103 to the Web Intents client 101. Thereby, the user can use the Web Intents service 103 via the UA 102.

The present embodiment describes a UA 102 that displays all of the Web Intents services 103 corresponding to the actions 802 that are defined by the Web Intents client 101. However, the Web Intents client 101 enables controlling display of the UA 102 by defining attributes other than the action 802. For example, an attribute is defined that means security to the content on the Web Intents client 101 side. The UA 102 invalidates the Web Intents service 103 that accesses through the internet and validates only a use from a local service. The local service is a Web Intents service 103 which exists in the UA 102.

While the present embodiment has described the configurations of each of the servers and devices, the software module configuration, and processing flows for using the service, but these are only examples and the invention is not limited thereto. Also, while the present embodiment has described Web Intents as an example of the function for calling the service, this is only an example of the service and the invention is not limited thereto.

Furthermore, the present embodiment has described that the Web Intents client 101 is a website that provides a scan function and that the Web Intents service 103 is a service that scans and stores the images. However, it is possible to apply the Web Intents client 101 as the image forming apparatus and the Web Intents service 103 as a MPS (Managed Print Service) such as prints service and the like.

Second Embodiment

The first embodiment has described that the servlet unit 750 is mounted in the Web Intents service supporting application 503, but it is possible to mount only the servlet unit afterward. For example, the servlet unit may be added to the application operating already. Also, the Intents processing unit may function as an invalidating unit of the Web Intents service and the Intents may invalidate only the servlet unit to forbid the processing request via the UA. And even if a servlet unit does not exist or is invalidated, the Web Intents service supporting application 503 can operate only on the content processing unit 753 or the UI processing unit 756 according to the instruction via the operating unit of the image forming apparatus. More specifically, it displays the screen on the operating displaying unit 612 and enables using the provided function by the operation of the user. In addition, by applications that share information using Intents other than the browser, data can be shared between applications. The Web Intents service supporting application 503 can be operated with or without the servlet unit, and adding functions and switching the operations of the functions afterward are possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-020724, filed Feb. 5, 2014, which is hereby incorporated by reference wherein in its entirety.

What is claimed is:

1. An image forming apparatus in which a relay function for sharing data between a plurality of applications and an application are operated, the image forming apparatus comprising,
a memory; and
a CPU in communication with the memory, wherein the CPU is configured to control:
an accepting unit configured to accept a processing request if the processing request is performed via the relay function by using function information of a function provided by the application;
an executing unit configured to execute the function provided by the application in response to an instruction according to the accepted processing request; and
a notifying unit configured to notify the relay function about a result executed by the executing unit, wherein the accepting unit and the notifying unit are realized as servlets mounted in the application.

2. The image forming apparatus according to claim 1, wherein the CPU is further configured to control an acquiring unit configured to acquire data to be used for executing the function by the executing unit via the relay function, and to be realized as a servlet.

3. The image forming apparatus according to claim 1, wherein the function information corresponding to the application is registered to the relay function and the application is selected from one or more applications that can execute the processing request.

4. The image forming apparatus according to claim 1, wherein the CPU is further configured to control an invalidating unit configured to invalidate a servlet to forbid the processing request via the relay function.

5. The image forming apparatus according to claim 1, wherein the executing unit executes the function provided by the application in response to an instruction via an operating unit of the image forming apparatus without the instruction according to the processing request via the relay function.

6. The image forming apparatus according to claim 1, wherein the relay function is an operating system or a browser which operates on the image forming apparatus.

7. The image forming apparatus according to claim 1, wherein, if a restriction condition is defined in the function information of the application, the function of the application is restricted.

8. A control method for an image forming apparatus in which a relay function for sharing data between a plurality of applications and an application are operated, the method comprising:

accepting a processing request if the processing request is performed via the relay function by using function information of a function provided by the application;

executing the function provided by the application in response to an instruction according to the accepted processing request; and notifying the relay function about a result executed by the executing unit, wherein each processing in the accepting and the notifying are realized by using servlets mounted in the application.

9. A non-transitory storage medium on which is stored a computer program that when executed causes a computer to function as respective units included in an image forming apparatus in which a relay function for sharing data between a plurality of applications and an application are operated, the image forming apparatus comprising, a memory; and a CPU in communication with the memory, wherein the CPU is configured to control:

an accepting unit configured to accept a processing request if the processing request is performed via the relay function by using function information of a function provided by the application;

an executing unit configured to execute the function provided by the application in response to an instruction according to the accepted processing request; and a notifying unit configured to notify the relay function about a result executed by the executing unit, wherein the accepting unit and the notifying unit are realized as servlets mounted in the application.

* * * * *